(12) United States Patent
Silva Simões

(10) Patent No.: US 8,967,135 B2
(45) Date of Patent: Mar. 3, 2015

(54) SOLAR HEATER SYSTEM FOR DOMESTICS WATERS

(75) Inventor: Joaquim Policarpo Silva Simões, Venda do Pinheiro (PT)

(73) Assignees: Nuno Goncalo Machado Simoes, Lisboa (PT); Joaquim Policarop Silva Simoes, Venda do Pinheiro (PT)

( * ) Notice: Subject to any disclaimer, the term of this patent is extended or adjusted under 35 U.S.C. 154(b) by 594 days.

(21) Appl. No.: 13/273,995

(22) Filed: Oct. 14, 2011

(65) Prior Publication Data

US 2012/0180781 A1 Jul. 19, 2012

Related U.S. Application Data

(63) Continuation-in-part of application No. 11/921,930, filed on May 16, 2008, now abandoned.

(30) Foreign Application Priority Data

Jun. 30, 2005 (PT) .......................................... 103300

(51) Int. Cl.
| F24J 2/32 | (2006.01) |
| F24J 2/44 | (2006.01) |
| F24J 2/34 | (2006.01) |
| F24D 17/00 | (2006.01) |
| F24J 2/24 | (2006.01) |

(52) U.S. Cl.
CPC .. *F24J 2/44* (2013.01); *F24J 2/345* (2013.01); *F24D 17/0021* (2013.01); *Y02B 10/20* (2013.01); *F24J 2/24* (2013.01); *Y02E 10/40* (2013.01); *F24D 2200/14* (2013.01); *F24D 2220/08* (2013.01); *F24D 2220/209* (2013.01)
USPC ........................... 126/639; 126/640; 126/636

(58) Field of Classification Search
CPC ............. F24J 2/32; F24J 2/345; F24J 2/4625; F28D 15/06; Y02E 10/44
USPC ......................................... 126/639, 640, 636
See application file for complete search history.

(56) References Cited

U.S. PATENT DOCUMENTS

| 4,205,660 A | 6/1980 | Kellberg et al. |
| 4,253,491 A * | 3/1981 | Worthen et al. ............ 137/601.2 |
| 4,473,063 A * | 9/1984 | Mackensen ................... 126/591 |
| 4,686,961 A * | 8/1987 | Garrison ....................... 126/635 |
| 4,766,885 A * | 8/1988 | Muramatsu ................... 126/636 |
| 4,898,153 A | 2/1990 | Sherwood |
| 7,832,217 B1 * | 11/2010 | Reich et al. ....................... 62/59 |
| 2007/0137639 A1 * | 6/2007 | Rhodes ........................ 126/570 |

FOREIGN PATENT DOCUMENTS

| DE | 4429838 A1 | 2/1996 |
| JP | 61-237969 A | 10/1986 |
| WO | 2004/090439 A1 | 10/2004 |

* cited by examiner

*Primary Examiner* — Avinash Savani
(74) *Attorney, Agent, or Firm* — Sughrue Mion, PLLC

(57) ABSTRACT

A solar heater with a primary circuit course in a panel for heating two separate inter connected storage reservoirs.

8 Claims, 3 Drawing Sheets

SOLAR HEATER SYSTEM FOR DOMESTICS WATERS

This application is a Continuation in Part of Application Ser. No. 11/921,930, filed May 16, 2008, claiming priority based on International Application No. PCT/PT2005/000014, filed Sep. 14, 2005, which claims priority based on Portugal Application No. 103300, filed Jun. 30, 2005, the disclosure of each is incorporated herein by reference.

BACKGROUND OF THE INVENTION

There has always been a great interest in the use of solar power for heating water.

The systems of prior art, however, have a low yield and users therefore complain that they have to consume a large amount of back-up electric power.

In order to resolve the problems existing in prior art, the applicant has devised a high-yielding system which basically results from the association between panels, as well as a utilization of a high stratification reservoir (wherein the cold water that enters does not mix with the hot water that exits, and wherein only after the first 150 liters are sufficiently hot are the other 150 liters heated).

Thus, a much higher yield is achieved, which provides much hotter water with the same solar radiation.

BRIEF DESCRIPTION OF THE DRAWINGS

The description which follows is based on the drawings attached hereto, which are of a non-restrictive nature and represent.

PRIOR ART

Hereunder is a brief explanation of the mode of operation of the systems of prior art, which function by thermosyphon, comparing them with the system of the invention (functioning by thermosyphon of panels connected in series).

The primary circuit which functions by thermosyphon can have a volume, with this type of equipment, of around fifteen liters and it works simply by gravity force and by the alteration of the water density due to temperature variations (functioning by thermosyphon).

Thus, if there is solar radiation, the water in the primary circuit is constantly travelling from panels (5) and (6) to reservoirs (3) and (4), where heat will be transferred from the water in the primary circuit to the water for consumption by means of heat exchangers (9) and (10), and afterwards from reservoir to panels (5) and (6) to be heated again.

The said panels are constituted by tubes where the water from the primary circuit circulates, by the sheet in the circuit which absorbs the heat and joins the tubes in order to direct the heat to them, and also by an insulating material and a piece of glass.

Figure 1:
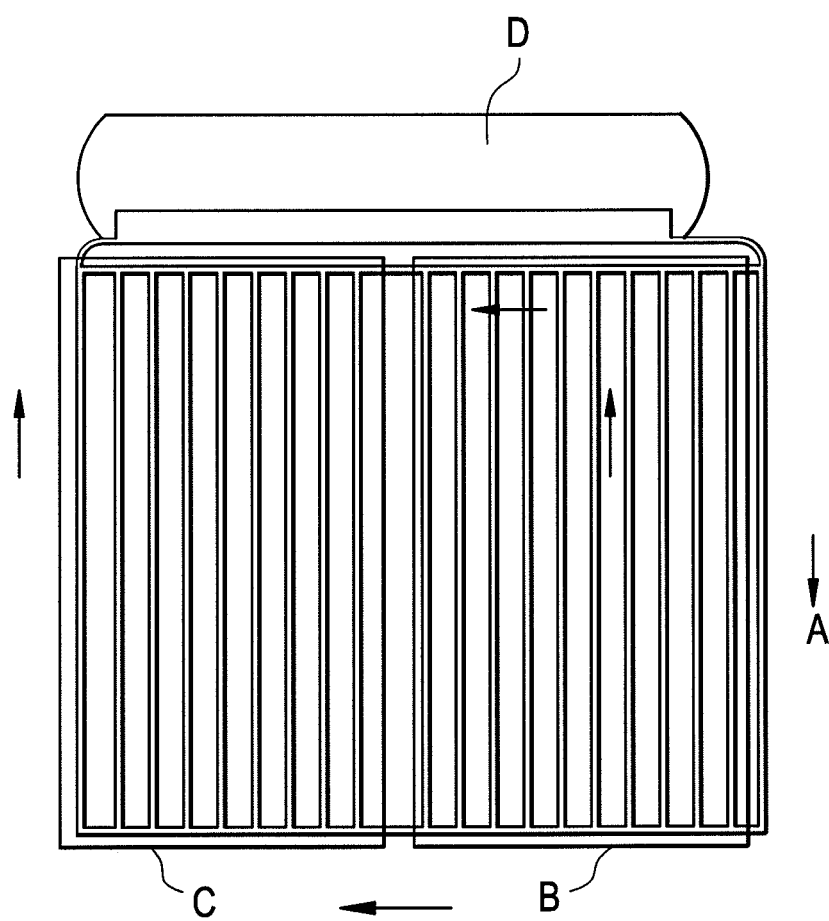
In FIG. 1, a panel belonging to prior art.
Figure 2:
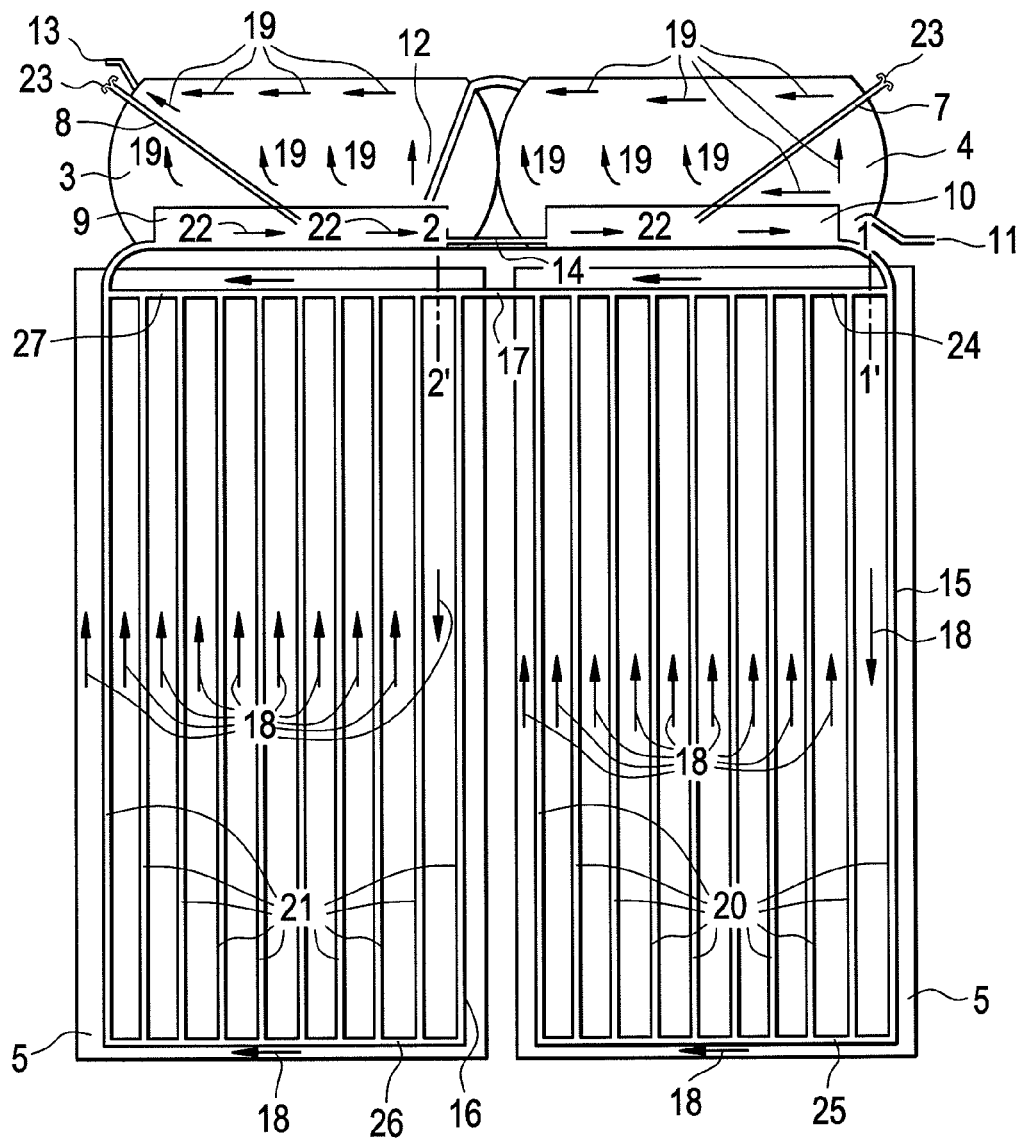
In FIG. 2, a panel according to the invention.
Figure 2:
Figure 2:
Figure 3:
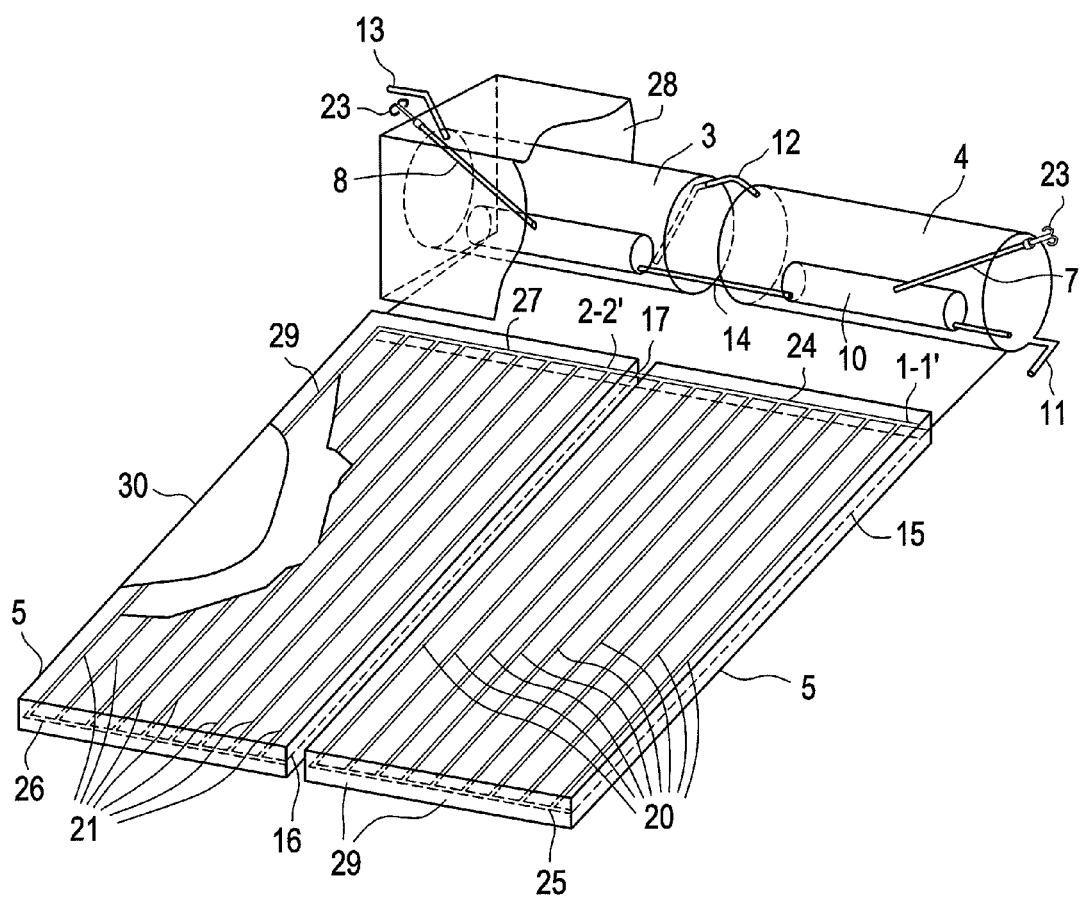
In FIG. 3, a perspective view and cross-section of the panel represented in FIG. 2.

In the others systems of prior art, the water course in the primary circuit is the following:
a) The less warm water which exits reservoir (C) goes down an external tube in the panels, outside of the heating zone (A), which causes loss of yield. The system of our invention does not have this external tube.
b) In the other system which function by thermosyphon the panels are arranged parallel to one other, i.e. upon each passage, the thermofluid either passes through panel B or through panel B and never through the two in the same cycle.
c) When the water enters the panels, and supposing that each panel is two meters high and one meter wide, it will travel four meters inside the heating zone (see FIG. 1), whatever its path inside the tubes, and two meters outside subject to cooling.
d) When the water returns to the reservoir, it transfers all its heat to just one reservoir (C), meaning that on days when there is little solar radiation, it is difficult to raise the temperature of the 300 liters of water, thus preventing it from being used. However, in the system of the invention the first 150 liters of water are heated in the panels, and only after they reach a very hot temperature are the other 150 liters heated.
e) Since the solar heater systems of prior art have just one reservoir, the cold water that enters mixes directly with the hot water that exits, thereby producing right from the outset a very unfavourable mix. In the system of the present invention, by making use of the fact that the panels connected in series function by thermosyphon, it is possible to obtain a drainage speed suitable for transferring all the initial heat to the first reservoir.

DETAILED DESCRIPTION OF THE INVENTION

As may be observed, the solar system of the invention for heating domestic water comprises solar panels functioning by thermosyphon in series, which have a primary circuit containing a fluid that passes between heat exchangers (9 and 10) mounted on reservoirs (3 and 4) containing piped water to be heated and tubes (15, 25, 20 and 24) and (16, 26, 21 and 27) of the panels (6 and 5). The said fluid of the primary circuit circulates by thermosyphon effect, the fluid of the primary circuit that comes from heat exchanger (10) entering directly into panel (6) through tube (15) and being heated immediately even though it is flowing downwards.

In the system of the invention, the course of the primary circuit is completely different as the thermofluid (water and antifreeze) has to travel ten meters inside the panels and is therefore always subject to heating.

The main question is to determine how the water can travel downwards after it exits the reservoir, bearing in mind that when entering the panels it will be heated and will want to travel upwards.

This is achieved by the fact that thermosyphon effect in the panels (6 and 5) is possible due to the total closure (1-1') of the upper tube (24), which forces the fluid to travel (18) down tube (15), even while it is being heated, circulating to tube (25) and flowing up tubes (20) to tube (24), from which it passes to the adjacent panel (5), and due to the partial closure (2-2') of tube (27), which forces the fluid to travel (18) down tube (16), circulating to tube (26) and flowing up tube (21) to tube (27), the end of which is connected to heat exchanger (9) of reservoir (3).

The downwards path of the fluid of the primary circuit in vertical tubes (15 and 16) is guaranteed by the suction caused by the fluid flowing up tubes (20 and 21), due to the fact that these tubes are greater in number than the single tube (15 and 16) in each of the panels.

Thus, for each panel of ten tubes, in nine tubes the water that wants to travel upwards will have sufficient power for there to be suction in tube (15) where the water, even though it is being heated, will be forced to travel downwards.

Since there is no connection between panels (5) and (6) in the lower part, the water enters the second panel (5) from above (17) and in the same way, in the first panel (6), the water is forced to travel down the first tube (16).

Therefore, the course of this primary circuit is meters long inside the heating zone, which is considerably greater than the four meters of the other systems.

This naturally means that the water in this primary circuit is significantly warmer.

The partial closure (2-2') has a bleeding function as it permits the passage of air in order to allow the fluid to circulate and the panels to be filled, i.e. if the primary circuit is filled through tube (7), the water will reach tube (25) and start to fill tubes (20), going down tube (16) and then filling tube (26), and when this happens the air remaining inside tubes (16, 20 and 24) will exit through the said partial closure (2-2'), thus avoiding air pockets which would prevent the thermosyphon from functioning, and if the primary circuit is filled through the other tube (8), the water will fill tubes (21, 16 and 26) and when it reaches tube (25), the air in tubes (20 and 24) will only be able to exit through the space reserved for the passage of air by means of the said closure (2-2'), whereby it may be concluded that if the closure (2-2') were total, the thermosyphon would not function.

This passage of air and the passage of an insignificant amount of fluid of the primary circuit means that nearly all of the said fluid goes down tube (16), having for this purpose a small air passage which acts as a bleeder for the system.

When entering the reservoirs, this circuit will have two heat exchangers (9) and (10) in the respective reservoirs (3) and (4). Thus, the thermofluid (water with antifreeze) which exits the panels and then enters the left-hand reservoir (3) will start by heating the water therein, and when the water passes to the second heat exchanger (10) (which is inside the right-hand reservoir (4)), it will already be much lower in temperature (minimum temperature of the first reservoir). That is to say, for example, if the water reaches the first heat exchanger (9) at 80°, the temperature in the first reservoir can rapidly be lowered to 50° in the upper part and 30° in the lower part.

Thus, the temperature which goes to the second heat exchanger (10) will be approximately 30° and will not significantly heat up the second reservoir.

As the temperature rises in the first reservoir which the water from the primary circuit reaches (3), the transfer of heat from the second reservoir (4) increases.

Thus, if we have water in the first reservoir in the upper part at 70° and in the lower part at 50°, the water from the primary circuit which goes to the second heat exchanger is already at a temperature of around 50° and the water in the other reservoir starts to heat up to temperatures suitable for consumption.

This effect is achieved precisely by the fact that the two panels function by thermosyphon and in series, which guarantees that the temperature is much higher per cycle and that the speed of the cycle is the most suitable for rapidly transferring the heat to the first reservoir that it encounters.

The water for consumption which passes from the highest part of the reservoir on the right-hand side (4) to the left-hand side (3) is also forced to go down to the bottom (12) of the reservoir on the left-hand side (3) for the same purpose, i.e. to delay as much as possible the "contact" between the piped water that enters (11) (which, throughout its course, is progressively heated) and the water that exits (13).

The cold piped water which enters on the right-hand side (11), i.e. in the reservoir containing water that is less hot (4), will not mix directly with the hot water that exits (13) the reservoir containing hotter water, thus preventing sudden decreases in the temperature of the water for consumption.

As may be understood from the above, the course (22) of the fluid in the primary circuit in the heat exchangers (9 e 10), in conjunction with the course (19) of the piped water to be heated in the reservoirs (3 e 4), allows the said reservoirs (3 e 4) to have a high degree of stratification and function with different temperatures, in view of the fact that the greater the difference in temperature between the primary fluid which reaches heat exchanger (9) from panel (5) and the piped water in reservoir (3), the greater will be the transfer of heat acquired in the panels (5 e 6) to the piped water in the said reservoir (3).

The cold piped water which enters reservoir (4) on the right-hand side through tube (11) does not mix directly with the hot water which exits the top of reservoir (3) on the left-hand side through tube (13), which allows the water to be progressively heated in the reservoir on the right-hand side (4), passing through tube (12) to the lower part of the reservoir on the left-hand side (3) so that it is heated even further in reservoir (3).

The tubes (7 e 8) for filling the primary circuit extend a few centimeters inside the respective heat exchangers (10 and 9), with the objective of always having some air in the primary circuit in order to allow space for the increased volume of the fluid which occurs at high temperatures, since the said circuit has to be plugged (23) so that the fluid will not evaporate when it reaches high temperatures.

The invention claimed is:

1. A solar heater system for heating water comprising:
    a plurality of solar panels, said panels being coupled in series,
    a plurality of heat exchangers comprising at least a first exchanger (9) and a second exchanger (10),
    a plurality of tanks comprising at least a first tank (3) and a second tank (4) for holding water to be heated,
    a primary circuit containing a fluid that passes between at least said first and said second heat exchangers (9 and 10), each of said heat exchangers being mounted on a respective one of said tanks (3 and 4) and containing piped water to be heated, and
    a first plurality of tubes (16, 26, 21 and 27) and a second plurality of tubes (15, 25, 20 and 24) each of said first plurality of tubes and said second plurality of tubes being coupled to each other, and to a respective one of the heat exchangers (9 and 10) and the solar panels,
    wherein at least said second heat exchanger (10) is coupled directly to one of said plurality of solar panels through one tube (15) of said second plurality of tubes,
    wherein said fluid in the primary circuit circulates by a thermosyphon effect,
    whereby the fluid in the primary circuit that flows from the second heat exchanger (10) and enters directly into said one solar panel through a first tube (15) of said second plurality of tubes and is heated immediately even though it is flowing downwards.

2. The solar heating system for heating water according to claim 1, wherein the thermosyphon effect in the solar panels is achieved by the total closure (1-1') of an upper tube (24) in said second plurality of tubes, which forces the fluid to travel (18) down said first tube (15) of said second plurality of tubes, while said fluid is being heated, circulating to a second tube of said second plurality of tubes (25) and flowing up third tubes (20) of said second plurality of tubes to said upper tube (24) of said second plurality of tubes, from which said fluid passes to an adjacent solar panel (5), and due to a partial closure (2-2') of an upper tube (27) of said first plurality of tubes, the fluid is forced to travel (18) down a first tube (16) of said first plurality of tubes, circulating to a second tube (26) of said first plurality of tubes and flowing up a third tube (21) of said first plurality of tubes to said upper tube (27) of said first plurality of tubes, an end of said upper tube of said first plurality of tubes being connected to the first heat exchanger (9) of the first tank (3).

3. The solar heating system for heating water according to claim 1, wherein the downwards path of the fluid of the primary circuit in said first tubes (15 and 16) is ensured by suction caused by the fluid flowing up the third tubes (20 and 21) of said first and second plurality of tubes,
   wherein the third tubes are greater in number than the first tube (15 and 16) in each of the panels.

4. The solar heating system for heating water according to claim 2, wherein the partial closure (2-2') permits the passage of air in order to allow the fluid to circulate and the panels to be filled,
   such that, if the primary circuit is filled through a second filler tube (7), the water will reach the second tube (25) of said second plurality of tubes and start to fill the third tubes (20) of said second plurality of tubes, going down the first tube (16) of said first plurality of tubes and then filling the second tube (26) of said first plurality of tubes,
   whereby the air remaining inside said first, third and upper tubes (16, 20 and 24) of said second plurality of tubes will exit through the said partial closure (2-2'), thus avoiding air pockets which would prevent the thermosyphon from functioning, and
   wherein, if the primary circuit is filled through a first filler tube (8), the water will fill said first, third and upper tubes (21, 16 and 26) of said first plurality of tubes and when water reaches the second of said second plurality of tubes (25), the air in the third and upper tubes (20 and 24) of said second plurality of tubes will only be able to exit through a space reserved for the passage of air by means of the said closure (2-2'), and
   whereby if the closure (2-2') is total, the thermosyphon would not function.

5. The solar heating system for heating water according to claim 4, wherein the partial closure (2-2') permits a passage of air and a passage of an insignificant amount of fluid of the primary circuit, such that nearly all of the said fluid goes down the third tube (16) of said first plurality of tubes, having for this purpose a small air passage.

6. The solar heating system for heating water according to claim 1, wherein a passage (22) of the fluid in the primary circuit in the exchangers (9 and 10), in conjunction with a passage (19) of the piped water to be heated in the first and second tanks (3 and 4), allows said first and second tanks (3 and 4) to be highly stratified and to function at different temperatures,
   whereby the greater a difference in temperature between the primary fluid that arrives at the first heat exchanger (9) from a solar panel and the piped water in the first tank (3), the greater the transfer of heat acquired in the panels to the piped water in the said first tank (3).

7. The solar heating system for heating water according to claim 6, wherein cold piped water that enters the second tank (4) on a right-hand side through an inlet tube (11) does not mix directly with hot water that exits at a top of the first tank (3) on the left-hand side through an outlet tube (13), which allows the water to be progressively heated in the second tank (4), passing through a connector tube (12) to a lower part of the first tank (3) to be heated further in the first tank (3).

8. The solar heating system for heating water according to claim 1, wherein the second and first filler tubes (7 and 8) for filling the primary circuit are placed a few centimeters inside the respective exchangers (10 and 9), and
   wherein some air is always in the primary circuit in order to allow room for the increase in volume of the fluid which occurs at high temperatures, in view of the fact that said circuit has to be closed (23) so that the fluid does not evaporate due to the high temperatures.

\* \* \* \* \*